United States Patent
Nitta et al.

[11] 3,787,217
[45] Jan. 22, 1974

[54] METHOD FOR CONTROLLING SEA ORGANISMS

[75] Inventors: Koyata Nitta; Hironari Sugiyama; Kiyoshi Takita; Hideo Itoh, all of Shimizu, Japan

[73] Assignee: Kumiai Chemical Industry Co., Ltd., Tokyo, Japan

[22] Filed: Dec. 17, 1971

[21] Appl. No.: 209,337

[30] Foreign Application Priority Data
Dec. 25, 1970 Japan.............................. 45-123985

[52] U.S. Cl.................. 106/15 AF, 71/67, 424/340
[51] Int. Cl............................................... C09d 5/14
[58] Field of Search............ 106/15 AF, 16, 17, 18; 260/612 R, 613 R; 424/340; 71/67

[56] References Cited
UNITED STATES PATENTS

| | | | |
|---|---|---|---|
| 2,233,080 | 2/1941 | Hester et al...................... | 260/612 R |
| 2,243,479 | 5/1941 | Hester............................ | 260/612 R |
| 3,279,984 | 10/1966 | Ballard et al.................... | 106/15 AF |
| 3,401,031 | 9/1968 | Inoue et al..................... | 260/612 R |
| 3,647,888 | 3/1972 | Rohr et al...................... | 260/612 R |

FOREIGN PATENTS OR APPLICATIONS
506,308   5/1939   Great Britain...................... 424/340

*Primary Examiner*—Lorenzo B. Hayes
*Attorney, Agent, or Firm*—Richard K. Stevens et al.

[57] ABSTRACT

The adherence of sea organisms, such as Blue mussel, Balanus, Oysters, Hydrozoa and the like to pipes for supplying sea water and the other articles in sea water can be prevented by using a diphenyl ether having the general formula

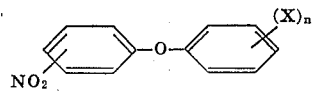

wherein X is a halogen, methyl, a lower alkoxy or amino group and $n$ is $1'$ to 3 as an active ingredient. The present invention relates to compositions for combatting sea organisms and a method for combatting sea organisms.

10 Claims, No Drawings

METHOD FOR CONTROLLING SEA ORGANISMS

The present invention relates to a composition for preventing adherence of sea organisms to pipes and equipments for sea water and the other articles in sea water and a method for preventing said adherence by using diphenyl ethers as an active ingredient.

An object of the present invention is to provide a composition for preventing the adherence of sea organisms to pipes and equipments for sea water and the other articles in sea water and to provide a method for preventing said adherence.

Furthermore, another object of the present invention is to provide a method for combatting sea organisms, such as Blue mussel, Balanus, Oysters, Hydrozoa, Serpulids, Bryozoa, Tunicates and Algae.

Sea water is increasingly used as an industrial cooling source for thermoelectric power stations, petrochemical factories or the like. The presence of sea organisms in the water, however, can cause various difficulties when using sea water as a cooling source. For example, varous types of sea organisms can decrease the cooling efficiency particularly when the water pipes become fouled by the adherence of Blue mussel, Balanus, Oysters, Hydrozoa or the like. Previously, chlorine or formaline has been used to control this difficulty. However, both are quite toxic to humans and animals and are corrosive to the operating equipment.

It would be desirable, therefore, to provide a composition which will effectively control such sea organisms, yet which is not highly toxic to higher animals and humans and which is not corrosive.

The composition of the present invention uses diphenyl ethers having the following general formula

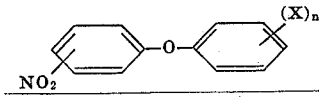

wherein X is a halogen, methyl, a lower alkoxy or amino group and $n$ is 1 to 3, as an active ingredient.

The composition comprises the above described diphenyl ether, and diluents, such as inert carriers and surface active agents and the term "inert carriers" used herein means vehicles for transporting the active ingredient to the desired portion.

When a carrier is used, it may be in the form of a solid or liquid. Suitable solid carriers include the various clays, kaoline, talc, diatomaceous earth, silica, vermiculite, calcium carbonate, sawdust, etc. Suitable liquid carriers include solvents or a solution of auxiliary agents for dispersing or solubilizing the active ingredient, e.g., water, benzene, kerosene, alcohol, acetone, methylnaphthalene, cyclohexanone, oils and fats, fatty acids, fatty acid esters and surface active agents.

The surface active agents include a nonionic surfactant, e.g., polyoxyethylene alkylaryl ether, polyoxyethylene sorbitanmonolaurate, etc.; a cationic surfactant, e.g., alkyldimethylbenzylammonium chloride, alkylpyridium chloride; an anionic surfactant, e.g., alkylbenzene sulfonate, lignin sulfonate, higher alcohol sulfate, etc.; an ampholytic surfactants, e.g., alkyldimethylbetaine, dodecyl aminoethyl glycine, etc.

As the diphenyl ethers mention may be made of the following compounds.

Compound 1.
2-methyl-4-chloro-4'-nitrodiphenyl ether—mp 54°C
Compound 2.
4-amino-4'-nitrodiphenyl ether—mp 131°–135°C
Compound 3.
4-methyl-2'-nitrodiphenyl ether—mp 49°C
Compound 4.
2-methoxy-4'-nitrodiphenyl ether—mp 104°C
Compound 5.
3-ethoxy-4'-nitrodiphenyl ether—mp 132°C
Compound 6.
2,4-dibromo-4'-nitrodiphenyl ether—mp 81°C
Compound 7.
2,4-dichloro-6-fluoro-4'-nitrodiphenyl ether—bp 180°–187°C/4mmHg
Compound 8.
4-bromo-4'-nitrodiphenyl ether—mp 64°C
Compound 9.
4-methyl-4'-nitrodiphenyl ether—mp 69°C
Compound 10.
3,4-dimethyl-4'-nitrodiphenyl ether—mp 92°C
Compound 11.
2,4,6-trichloro-4'-nitrodiphenyl ether—mp 105°–107°C
Compound 12.
4-iodo-4'-nitrodiphenyl ether—mp 71°C These compounds can be obtained by reacting a substituted phenol with chloronitrobenzene in the presence of sodium hydroxide to effect a dehydrochlorination condensation.

As the phenols, metnion may be made of trichlorophenol, dichlorofluorophenol, dibromophenol, bromophenol, chlorophenol, iodophenol, alkylphenol, dialkylphenol, alkoxyphenol, dialkoxyphenol, and aminophenol.

As chloronitrobenzenes, mention may be made of para, ortho and meta-chloronitrobenzene.

The production will be explained with reference to the following examples.

EXAMPLE 1

198 g (1 mol) of 2,4,6-trichlorophenol and 116 g (1 mol as KOH) of 48.5 percent by weight of an aqueous solution of sodium hydroxide were reacted while dehydrating and after the reaction 158 g (1 mol) of p-nitrochlorobenzene was added thereto and to the reaction mixture was added 300 g of nitrobenzene as a solvent and the resulting mixture was reacted at 200°C for 20 hours. The reaction product was subjected to steam distillation to distill off nitrobenzene and unreacted p-nitrochlorobenzene. THe residue was washed with an aqueous alkali solution and washed with water and then dried to obtain 249 g of a brown solid having a melting point of 99° – 101°C (Yield: 78.1 percent), which was 2,4,6-trichlorophenyl-4'-nitrophenyl ether having a purity of 93.2 percent as the result of infrared analysis.

EXAMPLE 2

Gaseous chlorine was introduced into phenol and they were reacted at a temperature of 60° – 70° C for about 8 hours until hydrogen chloride was not liberated to obtain 2,4,6-trichlorophenol having a purity of 98.4 percent. To 396 g (2 mol) of the thus obtained 2,4,6-trichlorophenol were gradually added 58 g (0.5 mol as KOH) of 48.5 percent of an aqueous solution of potassium hydroxide and 142 g (1.6 mol as NaOH) of 45 percent of an aqueous solution of sodium hydroxide and the mixture was reacted while dehydrating and then 346 g (2.2 mol) of p-nitrochlorobenzene was added thereto and the resulting mixture was reacted at a temperature of 200° C for 20 hours. The reaction product was recrystallized from 4 times of propyl alcohol to obtain 478 g of brown crystals having a melting point of 102° – 104° C (Yield: 75.1 percent), which was 2,4,6-trichlorophenyl-4'-nitrophenyl ether having a purity of 96.4 percent as the result of infrared spectrum.

EXAMPLE 3

125 parts (1 mol) of 45 percent of an aqueous solution of potassium hydroxide was fed in a glass reactor and then heated to 40° – 50° C and 181 parts (1 mol) of 2,6-dichloro-4-fluorophenol was added thereto within 15 minutes while stirring. Heat was evolved and the temperature of this reaction mixture was raised to about 70° – 80° C. While maintaining this temperature a major part of the water was distilled off under a reduced pressure and then 2 parts of copper powder was added thereto and further 353 parts (2.5 mol) of p-fluoronitrobenzene was added thereto within 1.5 hrs. The temperature of the reaction mixture was raised to 130° C over a period of 2 hrs., after which the reaction was carried out for 8 hrs. at this temperature. The remained water was completely eliminated during this step of raising the temperature. The reaction mixture was then subjected to steam distillation to distill off the unreacted p-fluoronitrobenzene, after which the residue was washed with an aqueous alkali solution and then washed with water and dried. The reaction product was purified by distillation under a reduced pressure (180° – 187° C/4mmHg) to obtain 221 parts (Yield: 73.4 percent) of yellow crystals having a melting point of 124° – 125° C.

The elemental analysis of these crystals was Cl, 23.10%; N, 4.41%; F, 6.08% (theoretical value for $C_{12}H_6Cl_2FNO_3$, Cl 23.47%; N, 4.64%; F 6.29%).

The dipehnyl ethers of the present invention are also quite effective for preventing the adherence of shells and other sea organisms. The compound of the present invention combats larvae of sea organisms which adhere on articles in sea water and live as plankton or brings the plankton into a syncopic state. As a result, possible difficulties caused by Blue mussel, Balanus, Oysters, or Hydrozoa can be easily prevented.

Unlike the methods used in the prior art for controlling these sea organisms, in particular, the use of chlorine or formalin, the compound of the present invention demonstrates a remarkably low toxicity to fish and useful shell-fish, and the residual toxicity after use is sufficiently low to be safe and to permit simple handling.

The Blue mussel is grown through young generation stages, such as Trochophora, Loven's larva, Veliger larva. The compound of the present invention is effective for combatting Trochophora and Loven's larva or for bringing them into a syncopic state. Balanus is grown through young generation stages, such as Nauplius, Siplius, and the compound of the present invention is also effective for combatting the Nauplius and Siplius.

Blue mussel is adhered to sea water pipes at the Trochophora stage. Accordingly, the adherence of Blue mussel can be prevented by combatting Trochophora.

The compounds of the present invention show the activity at a dose of 0.01 ppm – 0.4 ppm. The compounds are mixed with the diluents, such as carriers and surface active agents as described above and the resulting mixture is diluted with water and then added to sea water in such an amount that the above described concentration based on the flowing amount in the sea water pipe is attained. The satisfactory activity can be attained by adding the compounds to the pipes so as to make the concentration to be 0.1 – 0.2 ppm for one hour once a day. Alternatively, it is possible to add continuously the compound in a lower cencentration and further the compound of the present invention may be coated in a paint form containing 5 – 40 percent by weight of the compound.

The diphenyl compounds of the present invention can be used in the form of an emulsion or wettable powder prepared by admixing various additives therewith, such as a suitable carrier or a surface active agent.

The following is examples for preparing the compositions of the present invention.

The parts shown in the Examples are by weight. It should be understood that the Examples and experiments are intended for purposes of illustration only and are not intended to be limited unless otherwise specified.

EXAMPLE 4

20 parts of 2,4,6-trichloro-4'-nitrodiphenyl ether, 15 parts of surface active agent (admixture of polyoxyethylene alkylaryl ether and a salt of alkylaryl sulfonate) and 65 parts of xylene were admixed to make an emulsion, which was diluted with water.

EXAMPLE 5

20 parts of 2,4,6-trichloro-4'-nitrodiphenyl ether, 2 parts of a wetting agent, sodium alkylbenzene sulfonate, 2 parts of a dispersant, 10 parts of white carbon, and 56 parts of diatomaceous earth were mixed, crushed and diluted with water to prepare an applicable composition.

The types of additives and concentrations are not limited and can be modified over a broad range.

The following is the result of tests using this compound for controlling larvae of sea organisms.

EXPERIMENT 1

Each emulsion prepared in accordance with the process of Example 5 was diluted with sea water to the given concentrations as shown in the follwoing table. Larvae of Blue mussel and Balanus were immersed in the diluted solution for one hour and the mortality was determined by a microscope to obtain the following result.

| Compound | Concentration (ppm) | Blue Mussel | | | Balanus | | |
|---|---|---|---|---|---|---|---|
| | | Trochophora | Loven's larva | Veliger larva | Nauplius | Siplius | Adult |
| 1 | 0.1 | − | − | − | − | − | − |
| | 0.2 | + | + | − | + | + | − |
| | 0.4 | + | + | − | + | + | − |
| 2 | 0.1 | − | − | − | + | − | − |
| | 0.2 | + | + | + | + | + | − |
| | 0.4 | + | + | + | + | + | − |
| 3 | 0.1 | − | − | − | + | − | − |
| | 0.2 | + | + | − | + | + | − |
| | 0.4 | + | + | + | + | + | − |
| 4 | 0.1 | − | − | − | + | − | − |
| | 0.2 | + | + | + | + | + | − |
| | 0.4 | + | + | + | + | + | − |
| 5 | 0.1 | − | + | − | − | − | − |
| | 0.2 | − | + | + | + | + | − |
| | 0.4 | + | + | + | + | + | − |
| 6 | 0.1 | + | + | + | + | + | − |
| | 0.2 | + | + | + | + | + | − |
| | 0.4 | + | + | + | + | + | − |
| 7 | 0.1 | − | − | − | + | − | − |
| | 0.2 | + | + | + | + | + | − |
| | 0.4 | + | + | + | + | + | − |
| 8 | 0.1 | + | − | + | + | − | − |
| | 0.2 | + | − | + | + | + | − |
| | 0.4 | + | + | + | + | + | − |
| 9 | 0.1 | − | + | − | − | + | − |
| | 0.2 | + | + | + | + | + | − |
| | 0.4 | + | + | + | + | + | − |
| 10 | 0.1 | − | + | − | − | + | − |
| | 0.2 | − | + | + | + | + | − |
| | 0.4 | + | + | + | + | + | − |
| 11 | 0.1 | − | + | + | + | − | − |
| | 0.2 | − | + | + | + | + | − |
| | 0.4 | + | + | + | + | + | − |
| 12 | 0.1 | − | − | + | − | + | − |
| | 0.2 | − | + | + | + | + | − |
| | 0.4 | + | + | + | + | + | − |
| Non-treated | 0 | − | − | − | − | − | − |

Note: + Effective; − non-effective

EXPERIMENT 2

The following test was made in a sea water cooling apparatus.

The cooling sea water pipe was a one pass system with a capacity of 10,000 m³/hr over a 3 month winter period. 10 kg of the composition of Example 5 was injected for 1 hour, once a day. (the concentration of the compound in the sea water is 0.2 ppm)

The number of shell, mainly, Blue mussel, adhering to a slate test plate was measured.

It was observed that the number of shell-fish adhering to the test plate were 19,000 pieces/m², in the untreated water pipe, but only 200 pieces/m² in the treated water pipe with the compounds of this invention.

Having now fully described the invention, it will be apparent to one of ordinary skill that many changes and modifications can be made by one of ordinary skill in the art, without departing from the spirit or scope of the invention.

What is claimed is:

1. A method for preventing sea organisms which comprises applying an effective amount for combatting the sea organisms of a diphenyl ether having the general formula

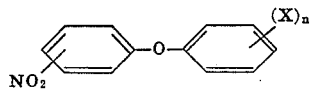

wherein X is a halogen, methyl, a lower alkoxy or amino group and $n$ is 1 to 3, on portions where the sea organisms are growing.

2. The method as claimed in claim 1, wherein said ether is monohalogenphenyl nitrophenyl ether.

3. The method as claimed in claim 1, wherein said ether is dihalogenphenyl nitrophenyl ether.

4. The method as claimed in claim 1, wherein said ether is trihalogenphenyl nitrophenyl ether.

5. The method as claimed in claim 1, wherein said ether is tolyl nitrophenyl ether.

6. The method as claimed in claim 1, wherein said ether is xylyl nitrophenyl ether.

7. The method as claimed in claim 1, wherein said ether is a lower alkoxyphenyl nitrophenyl ether.

8. The method as claimed in claim 1, wherein said ether is aminophenyl nitrophenyl ether.

9. A method for preventing adherence of sea organisms to sea water pipes and the other articles in sea water which comprises applying an effective amount for combatting the sea organisms of a diphenyl ether having the general formula

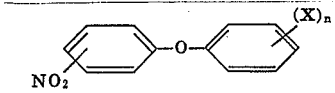

wherein X is a halogen, methyl, a lower alkoxy or amino group and $n$ is 1 to 3, to the sea water pipes and the other articles in sea water.

10. A method for preventing adherence of Blue mussel, Balanus, Oysters, Hydrozoa, Serpulids, Bryozoa, Tunicates or Algae to sea water pipes and the other articles in sea water which comprises applying an effective amount for combatting the above described sea organisms of 2,4,6-trichloro-4'-nitrodiphenyl ether to the sea water pipes and the other articles in sea water.

* * * * *